(12) United States Patent
Nunes et al.

(10) Patent No.: US 6,304,742 B1
(45) Date of Patent: Oct. 16, 2001

(54) PRINTER WITH SUPERPOSED TRAYS FOR PRINT OUTPUT AND DOCUMENT HANDLING

(75) Inventors: Vicente P. Nunes, Mississauga; Gary A. Faguy, Hamilton, both of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/512,699

(22) Filed: Feb. 24, 2000

(51) Int. Cl.[7] .................................................. G03G 15/00
(52) U.S. Cl. ........................... 399/361; 399/367; 399/405
(58) Field of Search .................................. 399/361, 363, 399/367, 374, 377, 381, 405; 271/314, 207, 278

(56) References Cited

U.S. PATENT DOCUMENTS

| | | | |
|---|---|---|---|
| 4,234,180 | 11/1980 | Looney | 271/3.1 |
| 5,534,989 | * 7/1996 | Rubscha et al. | 399/381 |
| 5,850,581 | 12/1998 | Roller | 399/2 |
| 6,134,417 | * 10/2000 | Fukasawa | 399/367 |
| 6,134,418 | * 10/2000 | Kato et al. | 399/405 |

* cited by examiner

*Primary Examiner*—Sophia S. Chen
*Assistant Examiner*—Hoan Tran

(57) ABSTRACT

In a multifunction printer with a print engine, an input tray for original document sheets to be imaged, an output tray for those document sheets, and a copy sheet output tray for copy sheets from the print engine. All three trays are vertically superposed over one another and over the print engine, without substantially extending laterally of the print engine, to provide improved access and a reduced footprint area for the printer. Preferably all three trays are provided by a single integral module providing a complete document handling unit, mounted on top of the print engine, with the copy sheet output tray on top. The copy sheet output tray may be an integral extension of the document handling unit. Preferably all three trays open towards the same side of the printer, above the print engine, so that the original document sheets and the copy sheets may all be conveniently accessed. The document handler may have a simple sheet transport path with a single large diameter sheet inverting and imaging station roller or drum for inverting the document sheets between the document input tray and the document output tray partially around that drum.

7 Claims, 2 Drawing Sheets

PRINTER WITH SUPERPOSED TRAYS FOR PRINT OUTPUT AND DOCUMENT HANDLING

Figure 1:
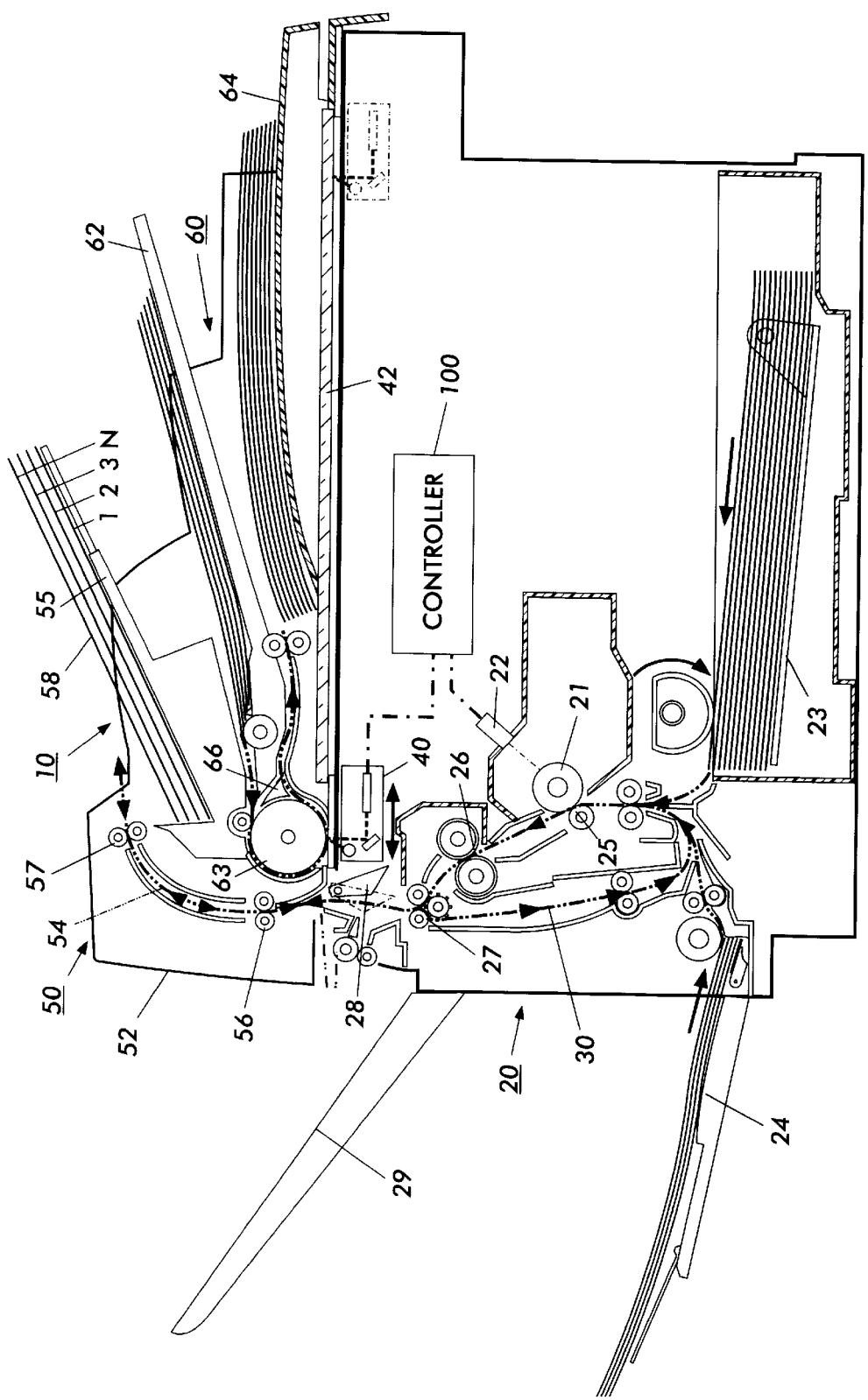

Cross-reference is made to an application having the same inventors, assignee and filing date; application Ser. No. 09/511,752.

Providing more compact and easier to use printers is particularly desirable for office and home use. Disclosed in the embodiment herein is a highly compact system in which a single plural function module mounted on a print engine can provide plural sheet handling functions with a superposed and conveniently positioned copy sheet output tray, as well as document sheet input and output trays of a document handling unit, for reduced space requirements, with both a copy sheet and the document handling trays in the same top module.

It may be seen from the disclosed embodiment that this copy sheet output stacking tray may be desirably provided at the very top of the overall printer unit, for user convenience in unobstructively observing and removing finished printed sheets. As shown, this copy sheet stacking tray may be desirably mounted superposed over both the document input and document output stacking trays of the document handler of this same module, thus not requiring any increase in the overall machine "footprint," or desk space.

Furthermore, the copy sheet output stacking tray of this plural mode module embodiment can be an alternative output tray relative to another output tray desirably provided with a different sheet stacking orientation. That is, the copy sheet output path within the module leading to the copy sheet output stacking tray can desirably have an arcuate sheet path (desirably shared with the inverter sheet path), and that copy sheet output path may desirably be different from another copy sheet output path from the printer to another, side, output, tray, so as to provide a different number of natural sheet path inversions, and thereby desirably provide a choice of sheet stacking outputs suitable for properly collated face up or face down output sheet stacking, for 1 to N or N to 1 sheet order printing, and simplex or duplex sheet printing.

In particular, the disclosed embodiment discloses a multifunction printer with a print engine, an input tray for original document sheets to be imaged, an output tray for those document sheets, and a copy sheet output tray for copy sheets from the print engine, in which all three trays are vertically superposed over one another and over the print engine, without substantially extending laterally of the print engine, to provide improved access and a reduced footprint area for the printer. Preferably all three trays are provided by a single integral module providing a complete document handling unit, mounted on top of the print engine, with the copy sheet output tray on top. The copy sheet output tray may be an integral extension of the document handling unit. Preferably all three trays open towards the same side of the printer, above the print engine, so that the original document sheets and the copy sheets may all be conveniently accessed. The disclosed document handler may have a simple sheet transport path with a single large diameter sheet inverting and imaging station roller or drum for inverting the document sheets between the document input tray and the document output tray partially around that drum.

The use of various modular components in printers (this term as used herein broadly includes copiers, multifunction, and other reproduction machines) is well known to those in that art. One example is shown in Xerox Corp. U.S. Pat. No. 5,850,581 issued Dec. 15, 1998 to George J. Roller, and other art cited therein. Others are provided in printers with print engines similar to the example shown in the embodiment herein, such as Xerox Corp. U.S. Pat. Nos. 5,835,823; 5,784,671; 5,778,284; 5884,123; and 5,881,340.

It has been well know for many years to provide a document handling module on top of copiers or other printers, for feeding image bearing sheets from a stack thereof to be imaged for one or more of electronic image storage, electronic transmission, faxing, local or remote printing, direct copying, etc.. An example is Xerox Corp. U.S. Pat. No. 5,534,989 issued Jul. 9, 1996 to Robert F. Rubscha, et al, and other art cited therein. Various other types of document (original sheets) feeding systems are also known in the art, such as Xerox Corp. U.S. Pat. No. 4,234,180 to Looney. The present plural mode module and system is not limited to details of a specific document handling system.

However, such prior art document handling modules were limited in function to handling the original document sheets, per se, and did not compatibly provide the other valuable printer functions within the same modular unit and space as disclosed herein.

Further by way of background, it is know in the art, as described for example in prior Xerox Corp. U.S. Pat. Nos. 5,749,024; 5,215,298; 4,459,013; to be desirable (to provide proper page order collation) to output stack copy sheets face down if they are printed in forward or 1 to N order, and to output stack copy sheets face up if they are printed in reverse or N to 1 order. It is likewise known to provide two different output paths and output trays for this purpose, to accommodate either printing order, or for optimal simplex or duplex printing orders. It is also well known to feed the original documents with a document handler to a copier, scanner, or facsimile machine in 1 to N order, from the top of a face-up stack, as shown in various of the above-cited document handler patents, or from the bottom of a face down stack. However, some other copiers such as that described for example in Xerox Corp. U.S. Pat. No. 4,278,344, and some other scanner or multifunction systems, feed the original documents from the bottom of a face up stack, which feeds the sheets to be imaged in N to 1 order. Thus, especially for a networked printer mode of operation, it is known to be desirable to be able to accept electronic documents in either order, without having to use a copy sheet reversing type of output path inverter, i.e. to have two different copy sheet output paths, one of which provides a natural inversion in the output path relative to the other.

Various sheet inverting systems with sheet reversing chutes for duplexing are known in the art, for copies or documents, including, for example, gateless or Mylar flap gated inverters with curved baffles defining the reversing chute so as to flip the trail edge over to the inverter exit rolls. E.g., Xerox Corp. U.S. Pat. No. 5,303,017 issued Apr. 12, 1994.

A specific feature of the specific embodiment disclosed herein is to provide in a multifunction printer with a print engine, an input tray for original document sheets to be imaged, an output tray for said original document sheets, and a copy sheet output tray for copy sheets from said print engine, the improvement wherein: all three said trays are vertically superposed over one another and over said print engine, without substantially extending laterally of said print engine, to provide improved access and a reduced footprint area for said multifunction printer.

Further specific features disclosed in the embodiment herein, individually or in combination, include those wherein said copy sheet output tray for said copy sheets from said print engine is on top of both of said input tray for said original document sheets to be imaged and said output tray for said original document sheets; and/or wherein all three said trays are provided by an integral module mounted on top of said print engine; and/or wherein all three said trays open towards the same side of said multifunction printer, above said print engine, so that said original document sheets and said copy sheets may be conveniently accessed; and/or wherein there is an integral module mounted on top of said print engine comprising a document handling unit providing said input tray for original document sheets to be imaged and said output tray for said original document sheets, and wherein said copy sheet output tray is an integral extension of said document handling unit; and/or wherein said input tray for said original document sheets to be imaged and said output tray for said original document sheets are operatively connected by a sheet transport path having a single large diameter sheet inverting drum for inverting said original document sheets between said input tray and said output tray partially around said sheet inverting drum; and/or wherein an imaging station is provided closely adjacent to said large diameter sheet inverting drum.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

The term "printer" or "reproduction apparatus" as used herein broadly encompasses various printers and/or copiers or multifunction machines or systems, xerographic or otherwise. The term "sheet" herein refers to a usually flimsy physical sheet of paper, plastic, or other suitable physical substrate for images, whether precut or web fed. A "copy sheet" may be abbreviated as a "copy" or called a "hardcopy". A "print job" is normally a set of related sheets, usually one or more collated copy sets copied from a set of original document sheets or electronic document page images, from a particular user, or otherwise related. A "simplex" document or copy sheet is one having its image and any page number on only one side or face of the sheet, whereas a "duplex" document or copy sheet has "pages", and normally images, on both sides, i.e., each duplex sheet is considered to have two opposing image sides or "pages" even though no physical page number may be present. An "original" may of course be a previously printed copy sheet.

As to specific components of the subject apparatus or methods, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be described herein.

Figure 2:
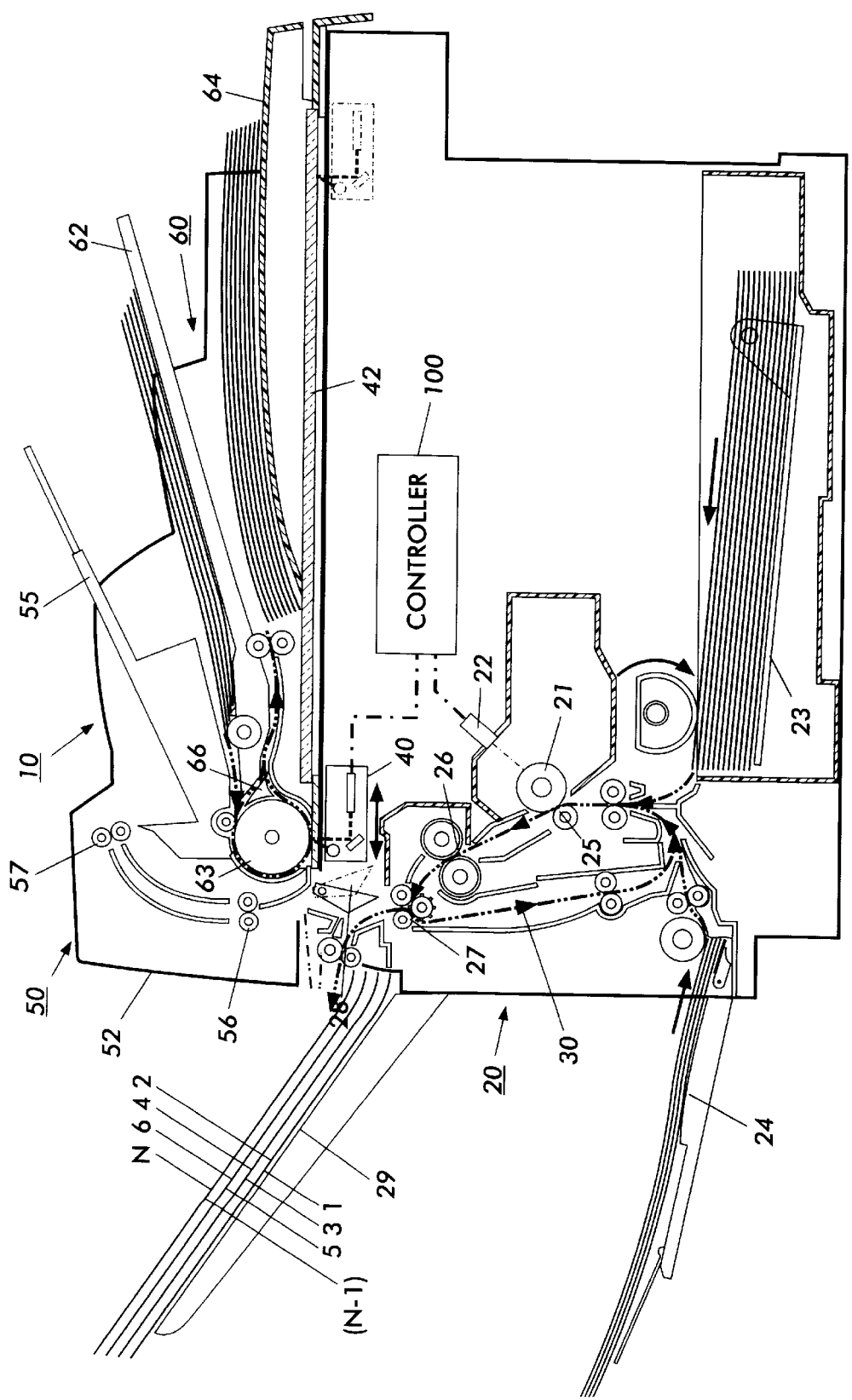

Various of the above-mentioned and further features and advantages will be apparent to those skilled in the art from the specific apparatus and its operation or methods described in the example below, and the claims. Thus, the present invention will be better understood from this description of this specific embodiment, including the drawing figures (which are approximately to scale) wherein:

FIG. 1 is a partially schematic frontal view of an exemplary printer with a print engine especially adapted to be operatively cooperatively engaged with a example of the subject plural function module mounted thereon, and shown operating in a first mode of operation; and FIG. 2 is the same view of the same printer and plural function module of FIG. 1, but illustrating a different mode or step of operation.

Describing now in further detail the exemplary embodiment with reference to the Figures, there is shown a reproduction system 10, by way of one example of an application therewith of the subject plural mode module therewith. This specific disclosed embodiment of a reproduction system is a multi-function digital printer 10 with a print engine 20 such as is disclosed in the above-cited Xerox Corp. U.S. Pat. Nos. 5,835,823; 5,784,671; 5,778,284; 5884,123; and 5,881,340.

The illustrated print engine 20 is an otherwise general conventional xerographic print engine having a photoreceptor 21 imaged by a scanning laser or other imaging system 22. Copy sheets to be printed are fed from a copy paper supply (cassette) 23, or an alternate paper input 24, to an image transfer station 25 with the photoreceptor 21, then to a fuser 26 which feeds the printed sheet on to one nip of a two nip tri-roll sheet feeder 27. The printed sheet is fed on from the sheet feeder 27 to a paper path decision gate 28. There are two illustrated conventional copy sheet inputs to the print engine 20, the integral paper tray or cassette 23 and the external bypass tray input 24, but it is well know to have others.

When this gate 28 is in its illustrated solid line position of FIG. 2 (versus its illustrated dashed-line or phantom position of FIG. 1), the printed sheet is then deflected directly out of the side of the print engine 20 through conventional exit rolls to individually stack last printed sides up in a side output sheet stacking tray 29. FIG. 2 illustrates in this side output stacking tray 29 a stack of duplex printed sheets printed in 1 to N page order with their second sides printed after their first sides and printed with the next highest page number, so as to stack as a completed document set, face down in properly collated order.

As will be further described below with reference to the plural function module 50 which forms an operative part thereof, the print engine 20 also has a duplex loop (return) path 30, illustrated in FIG. 1 by a dashed line with movement arrowheads. This duplex path 30 provides for optional duplex sheet printing by feeding a sheet printed on one side around to the photoreceptor 21 again to print a second side image on the opposite side of that sheet, which duplex printed sheet may then be outputted to side tray 29 as described above and shown in FIG. 2. That is, for duplex printing here, sheets initially printed on one side (their first side) are fed past the decision gate 28 (in the illustrated solid-line position of that gate in FIG. 1) up into the module 50, reversed therein, and returned by the module 50 back to the other nip of the tri-roll feeder 27, which feeds the sheet down into this duplex loop path 30.

Also illustrated in this example as an integral part of the print engine 20 is a conventional digital image input scanner 40 mounted under a conventional imaging platen 42. As shown here, and further described in the above-cited U.S.

Pat. No. 5,534,989, etc., the scanner 40 may be stationarily parked under the imaging station of a moving documents input system provided by a document handler, as illustrated by its solid line position, or moved along under the platen 42 to image stationary documents thereon, as illustrated by the phantom line position of the scanner 40.

The print engine 20 or the entire printer 10 may be conventionally controlled by a controller 100, as indicated above.

Turning now to the subject of particular interest here, this is the exemplary plural function separate module 50 mountable on top of the print engine 20. This exemplary plural mode module 50 integrally provides several different sheet handling functions within its same compact space under its same external covers 52. Specifically, in this example:

(a) An integral document handling unit 60 for feeding original documents from a stack thereof in a document input tray 62 to a large diameter document imaging drum 63, such an elastomer covered aluminum cylinder, providing a constant velocity transport (CVT) moving the document over the image input scanner 40 and then feeding the document on out to stack in a document output tray 64 under the input tray 62. For duplex documents, a duplex documents gate 66 and reversible document exit rollers to the tray 64 (as described in the above-cited document handling U.S. Pat. No. 5,850,581 and other patents cited therein), can be used to invert and return duplex documents for second side imaging in the same manner.

(b) An integral copy sheets inverter system, provided by a reversible dual mode sheet paper path 54 with reversible sheet path drive rollers 56 and 57 providing sheet inversion by sheet motion reversal, with this reversible paper path 54 providing the sheet inversion path or chute of a sheet inverter in cooperation with a simple operatively connecting but separable sheet path connection to the duplex path 30 of the print engine 20.

(c) A copy sheet output path provide by unidirectional downstream motion operation of the same paper path 54 and its feed rollers 56 and 57. The rollers 57 in this mode provide output or exit feed rolls from the upper end of the sheet path 54 to a copy sheet output tray 55 which is on top of the module 50 and the entire printer 10. and, (d) A top output copy sheet output stacking tray 55 providing for face-down (last printed side down) stacking of printed copy sheets, in an easily visible and removable sheet stack 58, via the copy sheet output path provided by the dual mode paper path 54.

As indicated, this plural function module 50 integrally includes the dual mode paper path 54 (copy sheet inverter path and copy sheet output path) within a single module that would normally only contain just the document (originals) handler unit 60. Available otherwise unused space is thus utilized within the same single unit, all safely enclosed under the same external covers 52.

This is in contrast to prior art printer systems requiring substantial additional space inside of the print engine 20 itself for such a sheet inversion path or chute, since a sheet inversion path or chute must accommodate the length of the longest sheet to be inverted. Since most copier or multifunction machines have such a top mounted document handling module unit, this concept is applicable to various other such reproduction machines in addition to the example illustrated herein.

All of this is fully compatible with the normal functioning of the original document handling system 60 of this plural mode module 50, which can simultaneously provides feeding and imaging of original document sheets from the document entrance stacking tray 62 to the document exist or output stacking tray 64 thereunder. That is, the feeding paths and the stacking trays 62 and 64 for original documents here are all separate from any of the copy sheet paths and any of the copy sheet stacking trays. Yet, the copy sheet exit stacking tray 55 of this plural mode module 50 is desirably on top, overlying, superposed over, the two stacking trays 62 and 64 for original documents for easy retrieval of the stack of sheets 58 therefrom.

To recap, the integral copy sheets inverter system 54, 56, 57 here utilizes the same paper path 54 in a dual mode function, alternately being used for a copy sheet output path to the top output tray 55. That is, those copy sheets selected by the controller 100 as having been programmed to be duplex printed are inverted in this paper path 54 by being gated by gate 28 into, and fed up all of the way into, this path 54 and then reversed by conventional reversible servomotor, stepper motor or clutch reversal of the drives of the reversible feed rolls 56 and 57, which may be simple conventional pinch roller sets. Thus, instead of outputting that sheet fully into the alternate copy sheet stacking tray 55 (as noted below, it may extend partially out therein), that sheet is reverse driven to be fed back down the same path back and into the duplex path loop 30 of the print engine 20 for its second side printing. To express that another way, the plural mode module 50 takes the printed face up output from a top sheet exit from the print engine 20 (from the fuser 26 and the first nip of the feed rollers 27 of the print engine 20), drives the sheet fully into an arcuate sheet inversion chute or pocket formed by the sheet path 54 within the module 50, and reverses direction to exit the sheet from the module 50 back to the same opening in the top of the print engine 20, which provides a print engine 20 sheet re-entrance path, all in the proper sequence for duplexing.

For large copy sheets, such as U.S. legal size (8.5"×14") fed lengthwise, part of the space over the alternate copy sheet stacking tray 55 is also part of the copy sheet inverter system. That is, the lead edge area of large sheets is fed out over or partially into the tray 55 by exit rolls 57 before such large sheets are reversed for duplexing. That allows the large copy sheets reverse movement for inversion to starts after the trail edge of that sheet has fully cleared the fuser and the tri-roll feeder 27.

For copy sheets (copies or prints) being simplex printed in reverse or N to 1 order, the side exit tray 29 (which, in this system has an exit below the subject plural mode module) may be used for properly collated direct face up sheet stacking, directed by the gate 28.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a multifunction printer with a print engine, an input tray for original document sheets to be imaged, an output tray for said original document sheets, and a copy sheet output tray for copy sheets from said print engine, the improvement wherein:

all three said trays are vertically superposed over one another and over said print engine, without substantially extending laterally of said print engine, to provide improved access and a reduced footprint area for said multifunction printer.

2. The multifunction printer of claim 1, wherein said copy sheet output tray for said copy sheets from said print engine is on top of both of said input tray for said original document sheets to be imaged and said output tray for said original document sheets.

3. The multifunction printer of claim 1, wherein all three said trays are provided by an integral module mounted on top of said print engine.

4. The multifunction printer of claim 1, wherein all three said trays open towards the same side of said multifunction printer, above said print engine, so that said original document sheets and said copy sheets may be conveniently accessed.

5. The multifunction printer of claim 1, wherein there is an integral module mounted on top of said print engine comprising a document handling unit providing said input tray for original document sheets to be imaged and said output tray for said original document sheets, and wherein said copy sheet output tray is an integral extension of said document handling unit.

6. The multifunction printer of claim 5, wherein said input tray for said original document sheets to be imaged and said output tray for said original document sheets are operatively connected by a sheet transport path having a single large diameter sheet inverting drum for inverting said original document sheets between said input tray and said output tray partially around said sheet inverting drum.

7. The multifunction printer of claim 6, wherein an imaging station is provided closely adjacent to said large diameter sheet inverting drum.

* * * * *